(12) United States Patent
Regnell et al.

(10) Patent No.: US 7,637,557 B2
(45) Date of Patent: Dec. 29, 2009

(54) CAB FOR A MOTOR-DRIVEN TRACTOR VEHICLE

(75) Inventors: Hans Regnell, Ytterby (SE); Hans Alderson, Askim (SE)

(73) Assignee: Volvo Lastvagnar AB, Gothenburg (SE)

( * ) Notice: Subject to any disclaimer, the term of this patent is extended or adjusted under 35 U.S.C. 154(b) by 426 days.

(21) Appl. No.: 11/721,181

(22) PCT Filed: Feb. 22, 2005

(86) PCT No.: PCT/SE2005/000258

§ 371 (c)(1),
(2), (4) Date: Jun. 8, 2007

(87) PCT Pub. No.: WO2006/091129

PCT Pub. Date: Aug. 31, 2006

(65) Prior Publication Data

US 2009/0250970 A1 Oct. 8, 2009

(51) Int. Cl.
*B60R 3/00* (2006.01)
*B60J 7/00* (2006.01)

(52) U.S. Cl. ............... 296/180.2; 280/163; 280/166

(58) Field of Classification Search ............ 296/180.2, 296/180.3, 180.1, 190.08, 190.01; 280/163, 280/166

See application file for complete search history.

(56) References Cited

U.S. PATENT DOCUMENTS

| 4,925,235 A | * | 5/1990 | Fingerle ............... 296/180.2 |
| 4,991,906 A | | 2/1991 | Fingerle |
| 5,054,799 A | | 10/1991 | Fingerle |
| 5,788,321 A | | 8/1998 | McHorse et al. |
| 6,340,191 B1 | * | 1/2002 | Brady ................... 296/37.6 |

FOREIGN PATENT DOCUMENTS

DE 10000006 A1 7/2001

OTHER PUBLICATIONS

International Search Report for corresponding International Application PCT/SE2005/000258.

* cited by examiner

*Primary Examiner*—Joseph D Pape
(74) *Attorney, Agent, or Firm*—WRB-IP LLP

(57) ABSTRACT

A cab for a tractor vehicle is provided with side spoilers that form extensions of the side walls of the cab in a backward direction and that can pivot between a backward-directed position and a sideways-directed position in order to give access to the chassis space behind the cab. A step arrangement is mounted on the inside of one side spoiler in such a way that it can be moved between a raised position, in which it is concealed behind the side spoiler, when this is in its backward-directed position, and a lowered position, in which it has a part with steps located below the lower edge of the side spoiler.

15 Claims, 2 Drawing Sheets

CAB FOR A MOTOR-DRIVEN TRACTOR VEHICLE

BACKGROUND AND SUMMARY

The present invention relates to a cab for a motor-driven tractor vehicle, comprising a body that has a rear body wall and side walls that are provided with side panels that form an extension of at least a part of each side wall in a backward direction to a plane at a distance from the rear body wall and that are arranged to bridge an air space between the rear body wall and a front wall on a connected trailer in order to deflect the wind from the said space between the rear body wall of the cab and the front wall of the trailer while the vehicle is being driven, with the front edge of at least one side panel being joined to the rear edge of the associated side wall in such a way that it can pivot, in order to enable the side panel to be swung between a backward-directed position and a sideways-directed position.

In particular tractor vehicles for semi-trailers have cab bodies with side panels, so-called side spoilers, of the type described above, that are intended to prevent the formation of eddies in the air space between the rear wall of the cab and front wall of the semi-trailer, as such eddies increase the air resistance of the complete unit. When connecting the semi-trailer to the tractor vehicle, cables and pipes from the tractor vehicle's electrical and compressed-air systems must be connected to the electrical and compressed-air systems of the semi-trailer. The driver connects these cables and pipes manually to connections on the semi-trailer using quick-release connections. In order to be able to do this, the driver must climb up in the space behind the cab and, for this purpose, some form of step arrangement integrated into the tractor vehicle immediately behind the cab is required.

A common solution is to integrate steps into the tractor vehicle's fuel tank that is usually located immediately behind the cab on the side of the chassis, with the outside of the tank in line with the side wall of the vehicle cab. As these steps cannot project out to the side beyond the side of the tank, the steps are designed in such a way that they project into the interior of the tank, which, however, results in them encroaching on the space for fuel. The steps are formed of deep-pressed bowls made of steel plate that are welded into holes cut in the side of the tank, which contributes to increasing the cost of the tank.

It is desirable to achieve an integrated step arrangement for a vehicle cab of the type described in the introduction, that does not encroach on the fuel space in the tank and that, in addition, makes it possible to reduce the cost of manufacturing the tank.

According to an aspect of the invention a side panel is provided that can pivot on the side wall, and that, in the backward-directed position, faces inwards towards the said space with a step arrangement that can be moved between an upper storage position, in which it is at least essentially concealed behind the side panel, and an in-use position, in which it has a part with steps located below the lower edge of the side panel.

By utilizing an existing side panel that can pivot to support the step arrangement, a cheaper solution is achieved, that does not encroach on the tank space. An additional advantage in comparison with the known solution described above, in which the driver must climb up facing inwards towards the vehicle and then turn to face forwards in order to be able to move in a sideways direction into the tight space between the cab and the semi-trailer, is that here the driver climbs up facing forwards and then can move straight away in a sideways direction into the space.

BRIEF DESCRIPTION OF THE DRAWINGS

The invention is described in greater detail with reference to the embodiments shown in the attached drawings, in which.

DETAILED DESCRIPTION

Figure 1:
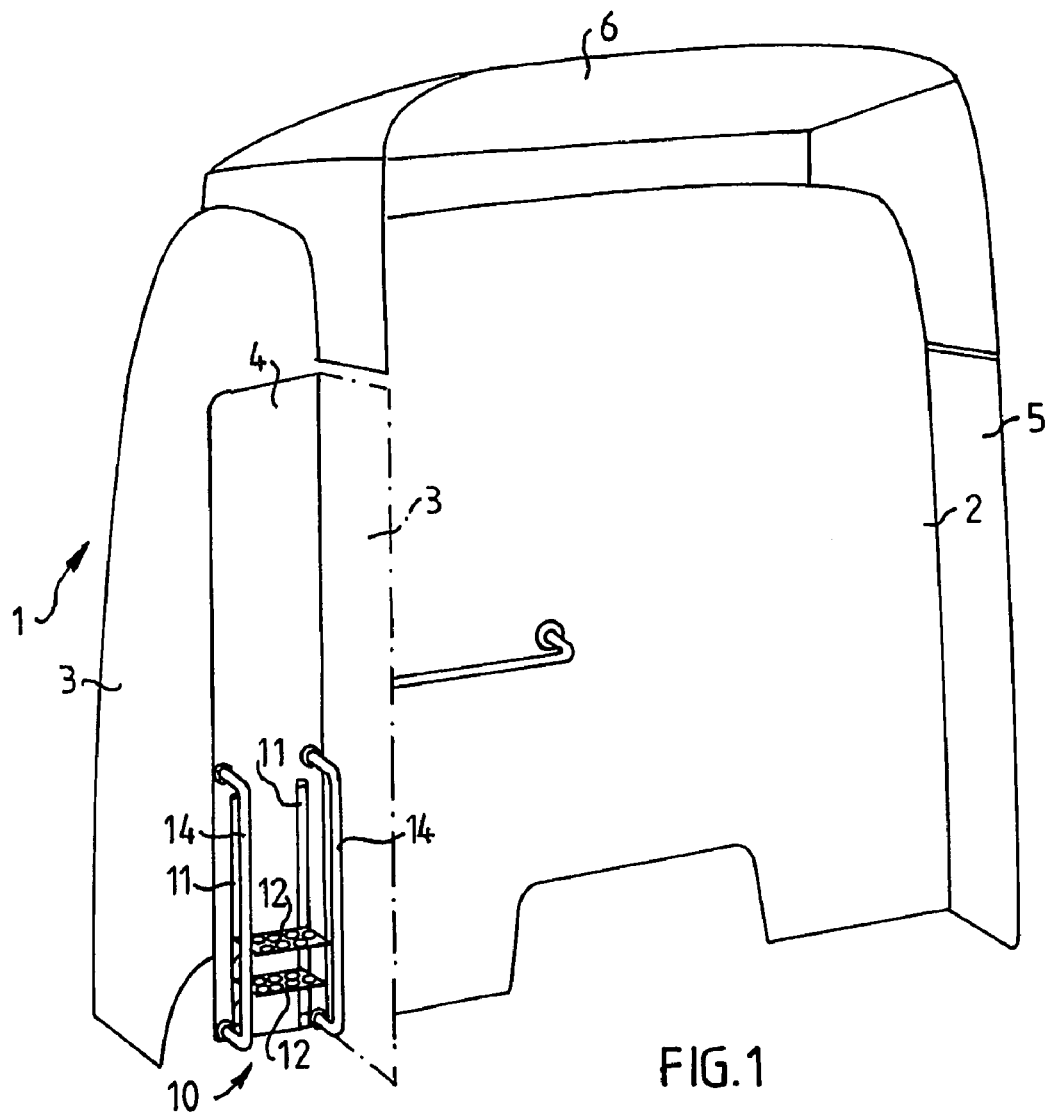
FIG. 1 shows a schematic perspective view of an embodiment of the body of a cab according to the invention viewed obliquely from the back and FIG. 2 shows an enlargement of a part of the cab in FIG. 1.

In FIG. 1, 1 represents in general the body of a cab of a tractor vehicle for semi-trailers, 2 represents the rear wall of the body, 3 represents one of its side walls, 4 and 5 represent two side air deflectors, so-called side spoilers, and 6 represents a roof spoiler.

The side spoiler 4 is attached to the side wall 3 of the body by means of a hinge arrangement (not shown), in such a way that it can pivot, in order to be able to be swung between a backward-directed position shown by chain-dotted lines and a swung-out position shown by solid lines that is at right angles to the backward-directed position. By means of a known locking device (not shown), the side spoiler can be locked in the respective positions.

According to the invention, a step arrangement, represented in general by 10, is mounted on the inside of the side spoiler 4. The step arrangement 10 comprises two side uprights 11 arranged a short distance apart, two steps 12 that are attached by their ends, for example by welding, between the uprights 11, and two tracks 13 that are attached to the inside of the side spoiler 4. The uprights 11 are mounted in the tracks 13 in such a way that they can move telescopically. For example, the uprights 11 can have a T-profile and the tracks 13 can have a corresponding complementary T-slot. Handrails 14 are mounted on each side of the tracks 13.

In an alternative embodiment, only one step 12 is attached between the side uprights 11 in a step arrangement, which step arrangement can otherwise be described in the same way as the step arrangement described above, which step arrangement is arranged on the inside of the side spoiler 4.

In FIG. 1, the side spoiler 4 is shown in a swung-out position in order to make room for the driver to climb up on a platform 16 (FIG. 2) that is mounted on the vehicle's fuel tank 15 in the space behind the cab 1. The step arrangement 10 is shown here in its storage position and, in the embodiment shown, has its lower end located above the lower edge 4a of the side spoiler 4.

Figure 2:
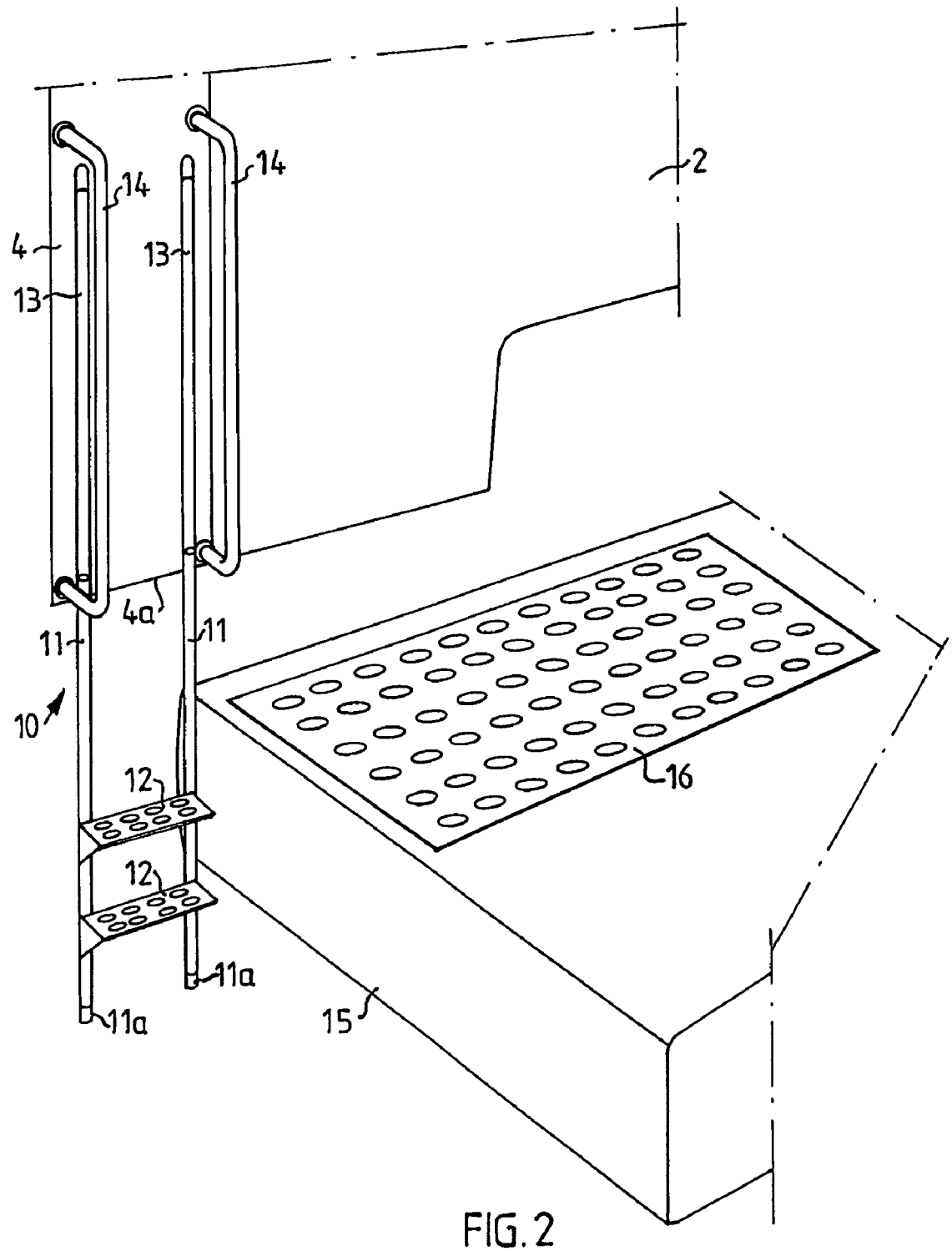

In FIG. 2, the step arrangement 10 is shown with the side uprights 11 lowered, so that the step 12 lies on a level that makes it easy for the driver to climb up on the platform 16. The side uprights 11 are preferably dimensioned in such a way that their lower ends 11a rest against the ground on which the vehicle is disposed, when the step 12 lies at the level shown in FIG. 2 in relation to the platform 16. In this way, the hinge arrangement of the side spoiler 4 is non-loadbearing when the step 12 is loadbearing.

The invention has been described above with reference to an embodiment of a step arrangement 10 that can be moved telescopically in relation to the side spoiler 4. Within the framework of the invention, it is of course possible, as an alternative to the described embodiment, to arrange the step arrangement to be suspended on the side spoiler in such a way that it can pivot, to enable it to be swung between an upper storage position and a lower in-use position. The advantage of the telescopic embodiment described above is, however, that the side uprights 11 can always be lowered as much as necessary in order for their lower ends 11a to be supported on the subframe of the vehicle, irrespective of whether this is uneven.

The invention claimed is:

1. A cab for a motor-driven tractor vehicle, comprising a body that has a rear body wall and side walls that are provided with side panels that form an extension of at least a part of each side wall in a backward direction to a plane at a distance from the rear body wall and that are arranged to bridge an air space between the rear body wall and a front wall of a connected trailer in order to deflect wind from the space between the rear body wall of the cab and the front wall of the trailer while the vehicle is being driven, with at least the front edge of one side panel being attached to the rear edge of the associated side wall in such a way that it can pivot, in order to enable it to be swung between a backward-directed position and a sideways-directed position, wherein, the pivoting side panel has a step arrangement on a side that faces inwards towards the space when in the backward-directed position, which step arrangement can move between an upper storage position, in which it is at least substantially concealed behind the side panel, and an in-use position, in which it has a part with steps located below a lower edge of the side panel.

2. The cab as claimed in claim 1, wherein when the step arrangement is in its in-use position, the part has at least two steps located below the lower edge of the side panel.

3. The cab as claimed in claim 1, wherein the step arrangement has support legs that rest against the ground on which the vehicle is disposed when the step arrangement is in its in-use position.

4. The cab as claimed in claim 1, wherein the steps of the step arrangement are attached to vertical upright elements that are arranged a distance apart, the upright elements being mounted in such a way that they can move in vertical tracks that are attached to the side panel.

5. The cab as claimed in claim 1, wherein the step arrangement is supported between two handrails that are attached to the side panel.

6. The cab as claimed in claim 2, wherein the step arrangement has support legs that rest against the ground on which the vehicle is disposed when the step arrangement is in its in-use position.

7. The cab as claimed in claim 2, wherein the steps of the step arrangement are attached to vertical upright elements that are arranged a distance apart, the upright elements being mounted in such a way that they can move in vertical tracks that are attached to the side panel.

8. The cab as claimed in claim 2, wherein the step arrangement is supported between two handrails that are attached to the side panel.

9. The cab as claimed in claim 6, wherein the steps of the step arrangement are attached to vertical upright elements that are arranged a distance apart, the upright elements being mounted in such a way that they can move in vertical tracks that are attached to the side panel.

10. The cab as claimed in claim 7, wherein the step arrangement is supported between two handrails that are attached to the side panel.

11. The cab as claimed in claim 9, wherein the step arrangement is supported between two handrails that are attached to the side panel.

12. The cab as claimed in claim 3, wherein the steps of the step arrangement are attached to vertical upright elements that are arranged a distance apart, the upright elements being mounted in such a way that they can move in vertical tracks that are attached to the side panel.

13. The cab as claimed in claim 3, wherein the step arrangement is supported between two handrails that are attached to the side panel.

14. The cab as claimed in claim 12, wherein the step arrangement is supported between two handrails that are attached to the side panel.

15. The cab as claimed in claim 4, wherein the step arrangement is supported between two handrails that are attached to the side panel.

* * * * *